United States Patent
Chow

(10) Patent No.: US 9,243,789 B1
(45) Date of Patent: Jan. 26, 2016

(54) PLANT LIGHTING DEVICE

(71) Applicant: Albert Chow, New Taipei (TW)

(72) Inventor: Albert Chow, New Taipei (TW)

( * ) Notice: Subject to any disclaimer, the term of this patent is extended or adjusted under 35 U.S.C. 154(b) by 7 days.

(21) Appl. No.: 14/339,264

(22) Filed: Jul. 23, 2014

(51) Int. Cl.
*F21S 4/00* (2006.01)
*F21V 23/02* (2006.01)
*A01G 7/04* (2006.01)
*F21K 99/00* (2010.01)
*F21V 31/00* (2006.01)
*F21Y 103/00* (2006.01)

(52) U.S. Cl.
CPC .............. *F21V 23/023* (2013.01); *A01G 7/045* (2013.01); *F21K 9/175* (2013.01); *F21V 31/005* (2013.01); *F21Y 2103/003* (2013.01)

(58) Field of Classification Search
CPC ............................... F21V 23/023; F21K 9/175
USPC ........................................ 362/249.01, 249.02
See application file for complete search history.

(56) References Cited

U.S. PATENT DOCUMENTS 3,987,335 A * 10/1976 Anderson ............. H01J 65/048
  313/491
2012/0306402 A1* 12/2012 Csikszentimrei .... H05B 41/142
  315/282

FOREIGN PATENT DOCUMENTS

TV          M437051 U1     9/2012

* cited by examiner

*Primary Examiner* — David V Bruce
(74) *Attorney, Agent, or Firm* — Muncy, Geissler, Olds & Lowe, P.C.

(57) ABSTRACT

A plant lighting device, constructed at an indoor planting system, includes an illumination module and a power module. The illumination module includes an assembly seat, and an illumination unit including a plurality of light emitting elements that emit light toward at least one plant when powered up. The power module, mounted on the assembly seat, includes a power input line, a ring transformer module connected to the power input line and receiving an external power to perform power transformation, and a power output line connected to the ring transformer module and the illumination unit. The ring transformer module includes a ring core, a primary coil winding around the ring core and connected to the power input line, and a secondary coil winding around the ring core and forming magnetic coupling with the primary coil to output a non-harmonic alternating current power to the power output line.

7 Claims, 4 Drawing Sheets

PLANT LIGHTING DEVICE

FIELD OF THE INVENTION

The present invention relates to a plant lighting device, and particularly to a plant lighting device which has a ring transformer module and can be constructed at an indoor planting system.

BACKGROUND OF THE INVENTION

As greenhouse planting technologies mature, many industrialists now replace the solar light by artificial light sources to lead plants to grow rapidly and thus reduce the growth cycle of the plants.

Currently, artificial light sources commonly referred to as plant lights are frequently used to hasten the growth of plants. Among these plant lights, light emitting diodes (LED) are often used as the main light source, such as the Taiwan Patent No. M437051. A plant light needs to be established with an electronic rectifier that transforms an alternating current (AC) power to a direct current (DC) power to turn on and drive the LED for illumination. During the process of power transformation of the electronic rectifier, power loss is resulted such that components may be heated. Therefore, many industrialists have proposed solutions for the issue of waste heat generated by the electronic rectifier, e.g., by additionally providing a heat dissipation structure. However, for the plant light, such means leads to not only a volume that cannot be effectively reduced but also increased costs unfavorable for sales. On the other hand, a main reason causing a malfunctioning plant light is due to the damage in the electronic rectifier. In other words, the probability of damage of the electronic rectifier is higher than that of the LED. In addition to issues of a complicated layout structure and unsatisfactory heat dissipation, the electronic rectifier further includes a high-frequency switch that likely generates high-frequency harmonics and electromagnetic interference (EMI) with the circuit board of the plant light, thus causing negative effects on the application of the LED.

SUMMARY OF THE INVENTION

The primary object of the present invention is to solve issues of unsatisfactory heat dissipation and EMI of the above conventional plant lighting device.

To achieve the above object, the present invention provides a plant lighting device that is constructed at an indoor planting system planted with a plurality of plants. The plant lighting device includes an illumination module and a power module. The illumination module includes an assembly seat and an illumination unit. The illumination unit is mounted on the assembly seat, and includes a plurality of illumination units that emit light toward at least one plant when powered up. The power module, mounted on the assembly seat, includes a power input line connected to an external power source to obtain an external power, a ring transformer module connected to the power input line and receiving the external power to perform power transformation, and a power output line connected to the ring transformer module and the illumination unit. The ring transformer module includes a ring core, a primary coil winding around the ring core and connected to the power input line to receive the external power, and a secondary coil winding around the ring core and forming magnetic coupling with the primary coil to output a non-harmonic alternating current (AC) power to the power output line.

In one embodiment, the ring transformer module includes a first casing and a second casing that separate the primary coil and the secondary coil after being correspondingly assembled to each other.

In one embodiment, the assembly seat is made of a metal material having a preferred heat dissipation coefficient.

In one embodiment, the assembly seat is a rectangular tube.

In one embodiment, the illumination module includes a sealing cover for sealing the ring transformer module therein.

In one embodiment, the illumination module is disposed at one side of the indoor planting system at a position planted with the plant.

In one embodiment, the illumination module is disposed above the indoor planting system at a position planted with the plant. With the structure set forth above, the present invention offers the features below compared to a conventional solution.

First of all, the plant lighting device of the present invention provides a stable and non-harmonic power for driving the light emitting elements. The ring transformer module of the present invention also has a preferred magnetic closed-loop characteristic capable of overcoming EMI issues, and provides a non-harmonic power through a preferred choke current characteristic.

In addition, the plant lighting device of the present invention prevents an illumination failure caused by accumulated heat. In the process of power transformation of the ring transformer module in the present invention, the amount of waste heat generated is much less, thereby eliminating issues of heat dissipation failure and heat accumulation on the illumination module.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
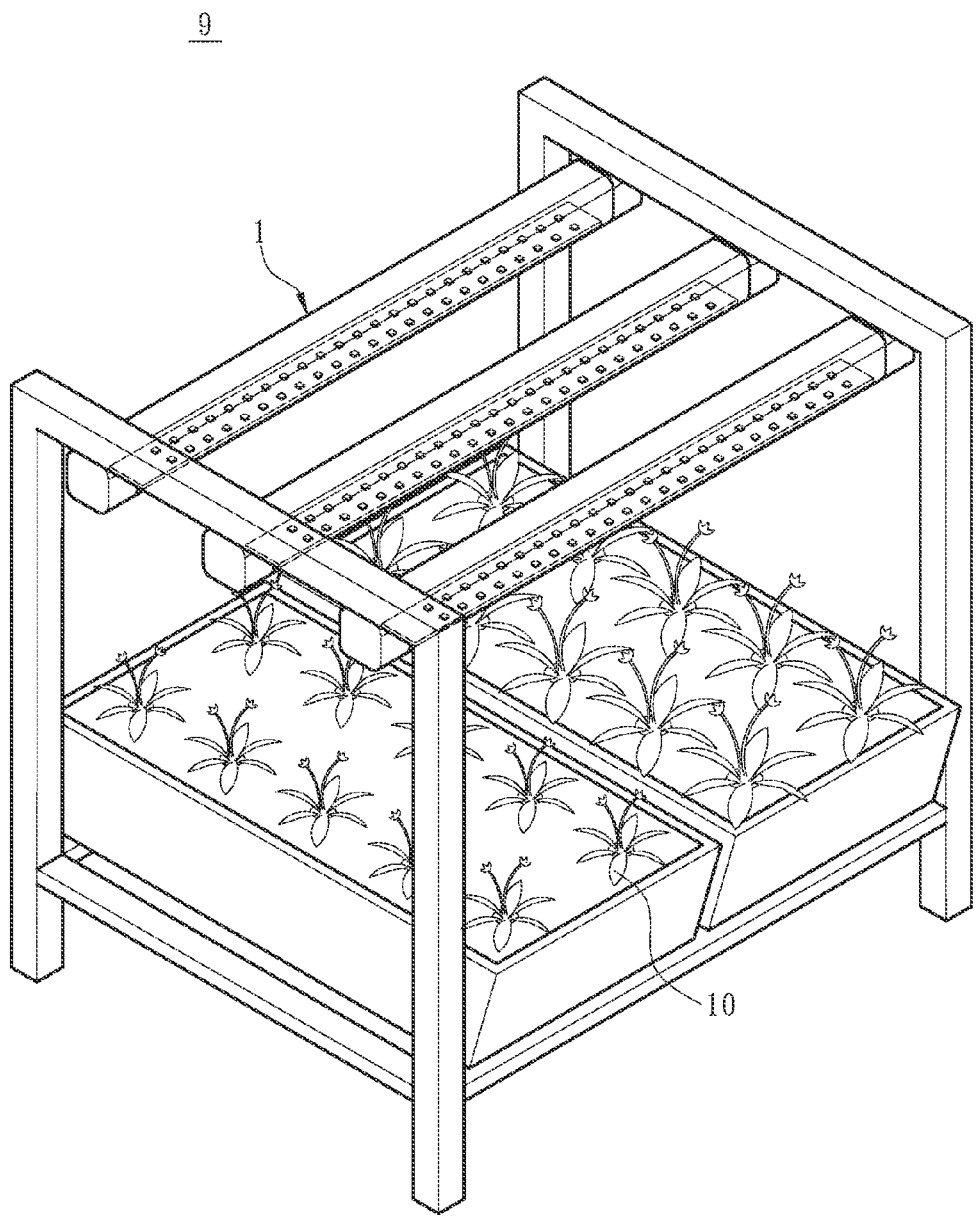
FIG. 1 is a schematic diagram of a plant lighting device according to an embodiment of the present invention.
Figure 2:
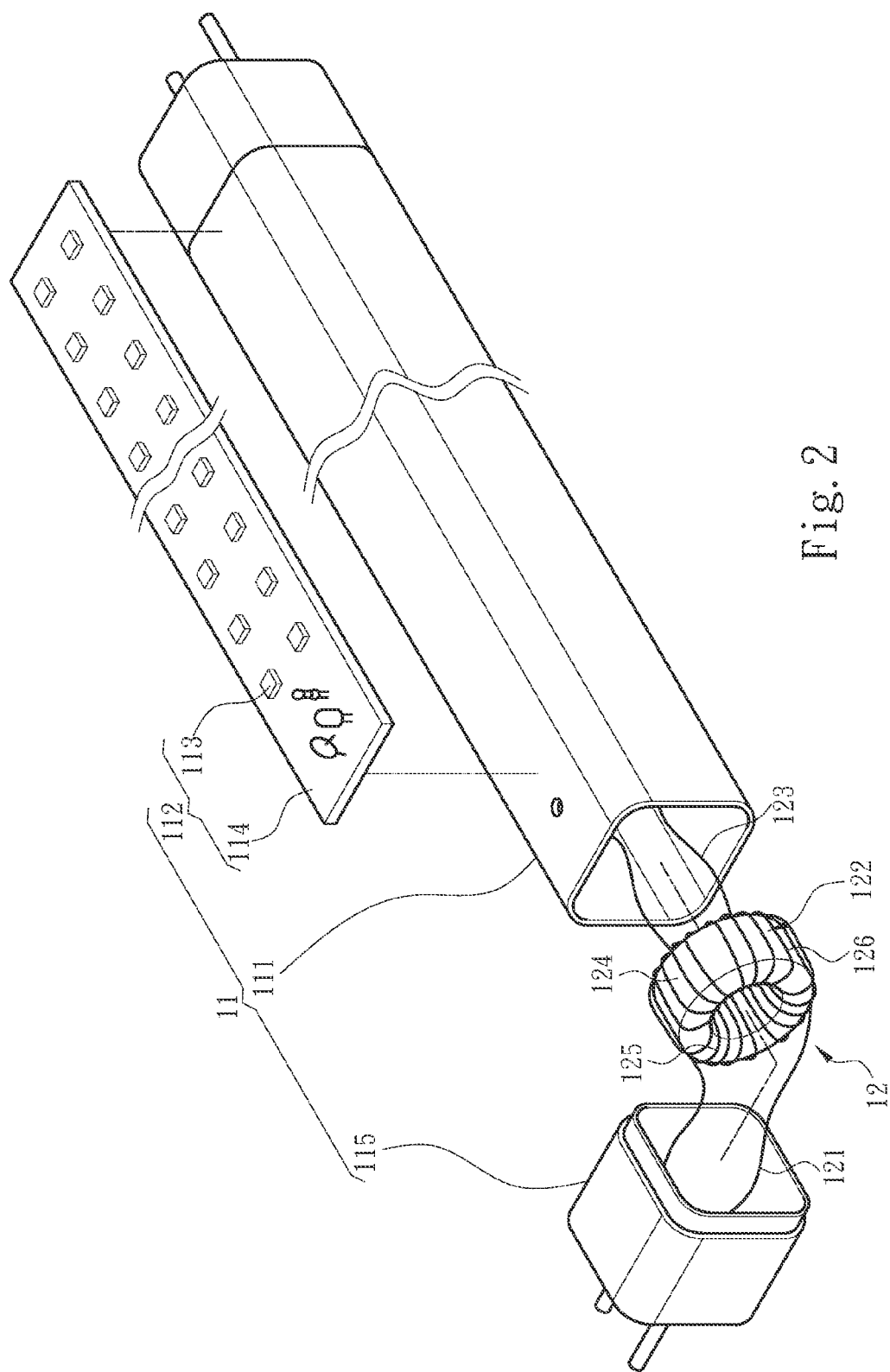
FIG. 2 is an exploded view of a plant lighting device according to an embodiment of the present invention.

Referring to FIG. 1 and FIG. 2, a plant lighting device 1 according to an embodiment of the present invention is constructed at an indoor planting system 9. The indoor planting system 9 may be a fish-vegetable symbiotic system or a greenhouse planting system, and is planted with a plurality of plants 10.

After being powered up, the plant lighting device 1 of the present invention emits light for the growth of the plants. At the indoor planting system 9, the plant lighting device 1 may be disposed above the positions where the plants 10 are planted, or may be disposed at one side of the positions where the plants 10 are planted. The plant lighting device 1 includes an illumination module 11 and a power module 12. The illumination module 11 includes an assembly seat 111, and an illumination unit 112 mounted on the assembly seat 111 and having a plurality of light emitting elements 113. The light emitting elements 113 may each be a light-emitting diode, and are regularly arranged at an interval on the assembly seat 111. The illumination unit 112 of the present invention may further include a circuit board 114 carrying the light emitting elements 113. The wavelength of the light emitted from the light emitting elements 113 is selected to correspond to the plants 10 according to the plants 10 planted. More specifically, the wavelength of the light emitted by the light emitting elements 113 may range between 400 nm and 700 nm.

The power module 12, mounted on the assembly seat 111, includes a power input line 121 connected to an external power source (not shown) to obtain an external power, a ring transformer module 122 connected to the power input line 121 and receiving the external power to perform power transformation, and a power output line 123 connected to the ring transformer module 122 and the illumination unit 112. Further, the ring transformer module 122 includes a ring core 124, a primary coil 125 winding around the ring core 124 and connected to the power input line 121 to receive the external power, and a secondary coil 126 winding around the ring core 124 and forming magnetic coupling with the primary coil 125 to output a non-harmonic alternating current (AC) power to the power output line 123. Further, the numbers of turns of the primary coil 125 and the secondary coil 126 may be appropriately adjusted according to required electrical characteristics of an application.

Figure 3:
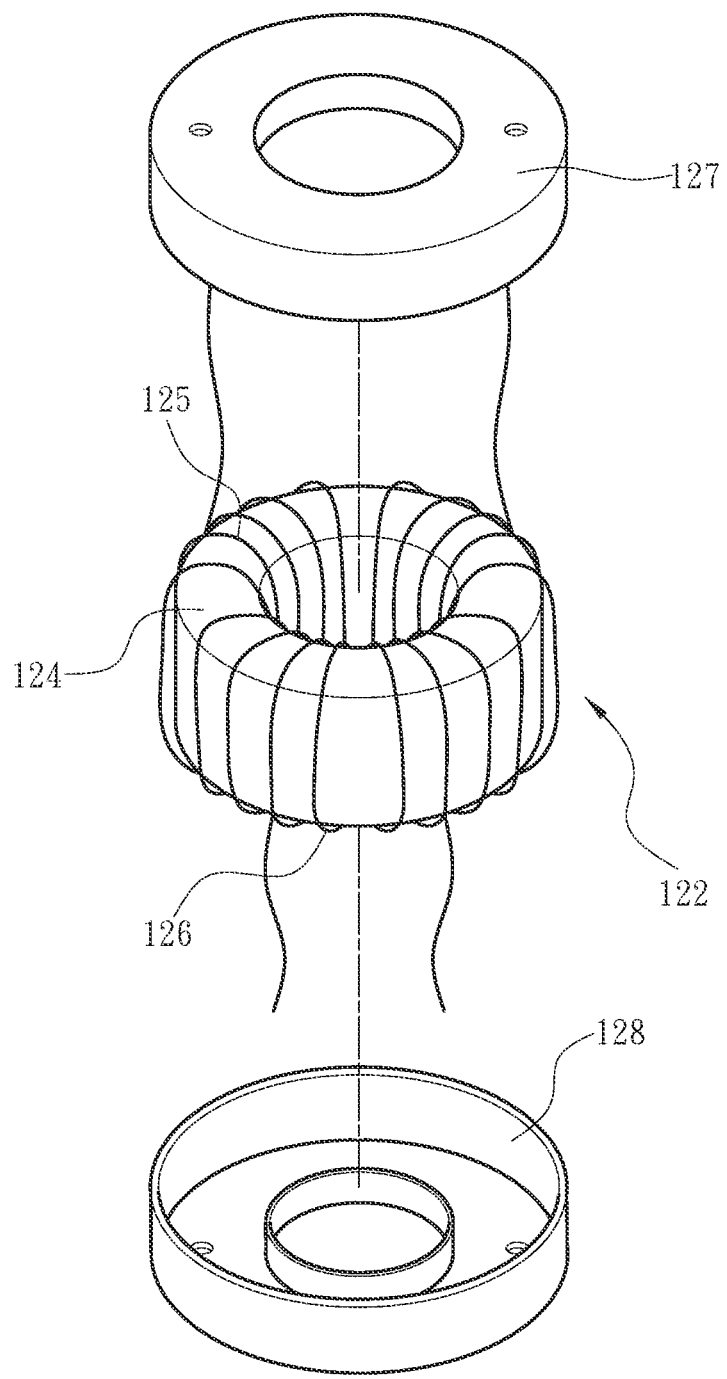
FIG. 3 is an exploded view of a ring transformer module in a plant lighting device according to an embodiment of the present invention.
Figure 4:
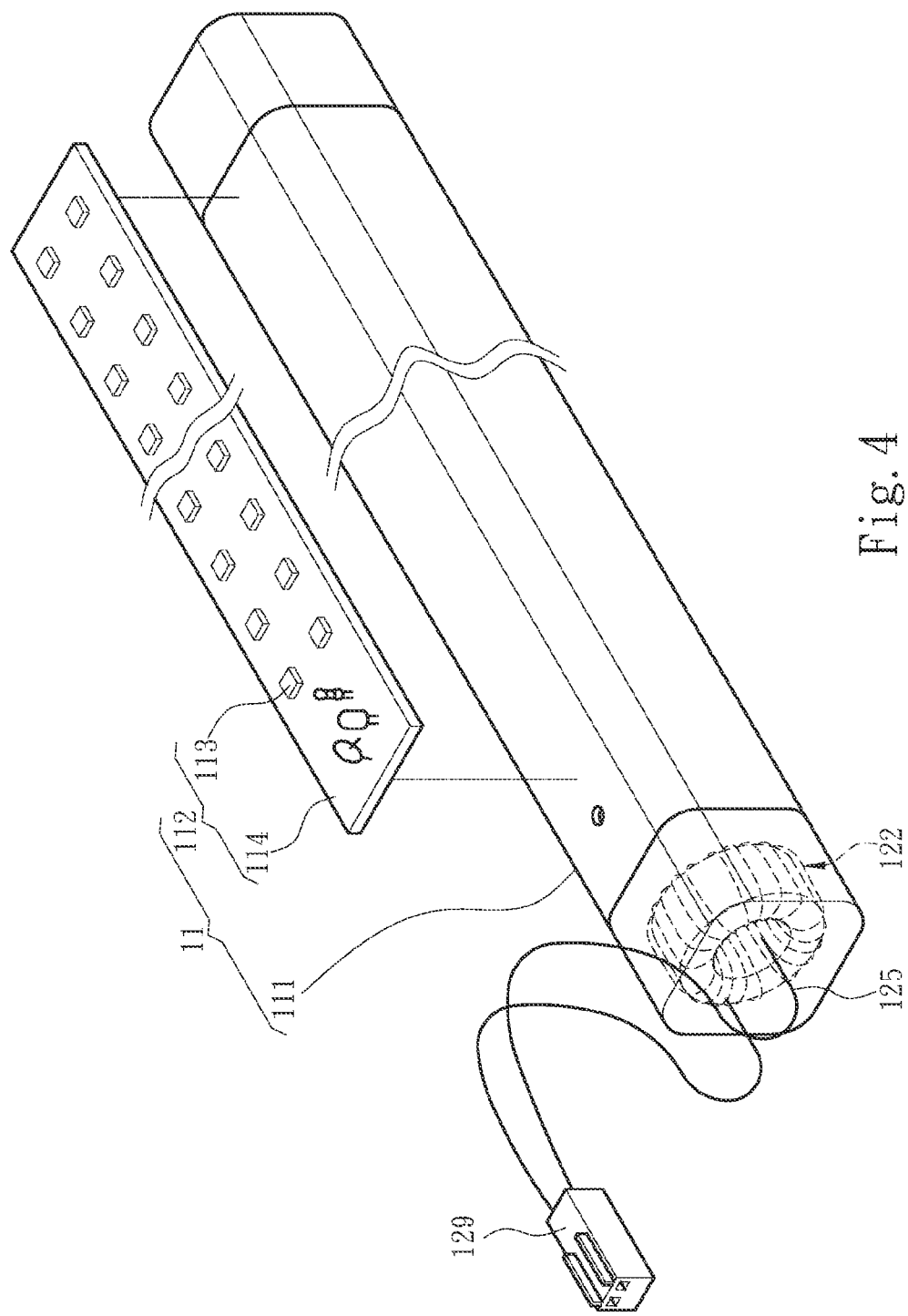
FIG. 4 is a schematic diagram of a plant lighting device according to another embodiment of the present invention.

Again referring to FIG. 1 and FIG. 2, to effectively dissipate the waste heat generated during the illumination process of the illumination module 11, the assembly seat 111 may further be made of a material having a preferred heat dissipation effect, such as copper and aluminum. Apart from removing the heat waste of the light emitting elements 113 by the assembly seat 111, the waste heat collected by the assembly 111 may further be converted to serve for a heating purpose. In other words, when the plant lighting device 1 of the present invention is installed in a cold climate or an extremely low-temperature environment, the assembly seat 111 may be used as a hot tube for heating use. Further, the assembly seat 111 may be a rectangular tube (as shown in FIG. 2). The illumination module 11 may further include a sealing cover 115 for sealing the ring transformer module 122 therein. Referring to FIG. 3, in one embodiment of the present invention, the ring transformer module 122 further includes a first casing 127 and a second casing 128 that separate the primary coil 125 and the secondary coil 126 when the first casing 127 and the second casing 128 are correspondingly covered to each other. That is, when the first casing 127 and the second casing 128 are assembled to each other, an insulation protective layer is formed to separate the primary coil 125 and the secondary coil 126. As such, EMI is prevented to provide purer and non-harmonic power for the light emitting elements 113. Further, as shown in FIG. 4, in one embodiment, the power module 12 of the present invention further includes a connection terminal 129, which is connected to the primary coil 125 of the ring transformer module 122 to obtain the external power. More specifically, the connection terminal 129 includes two power terminals and an insulation housing that covers the two power terminals.

In conclusion, the plant lighting device of the present invention is constructed at an indoor planting system, and includes an illumination module and a power module. The illumination module includes an assembly seat, and an illumination unit. The illumination unit is mounted on the assembly seat, and includes a plurality of light emitting units that emit light toward at least one plant when powered up. The power module, mounted on the assembly seat, includes a power input line connected to an external power source to obtain an external power, a ring transformer module connected to the power input line and receiving the external power to perform power transformation, and a power output line connected to the ring transformer module and the illumination unit. The ring transformer module includes a ring core, a primary coil winding around the ring coil and connected to the power input line to receive the external power, and a secondary coil winding around the ring core and forming magnetic coupling with the primary coil to output a non-harmonic AC power to the power output line. As such, the ring core of the present invention replaces a conventional electronic rectifier, and overcomes the EMI issue by the magnetic closed-loop characteristic of the ring core and the coils. Further, a non-harmonic operating power is provided according to a satisfactory choke current characteristic to further overcome other issues caused by the structure of a conventional solution.

What is claimed is:

1. A plant lighting device, constructed at an indoor planting system planted with a plurality of plants, comprising:
   an illumination module, comprising an assembly seat, and an illumination unit comprising a plurality of light emitting elements that emit light toward at least one of the plurality of plants when powered up; and
   a power module, mounted on the assembly seat, comprising a power input line connected to an external power source to obtain an external power, a ring transformer module connected to the power input line and receiving the external power to perform power transformation, and a power output line connected to the ring transformer module and the illumination unit; the ring transformer module comprising a ring core, a primary coil winding around the ring core and connected to the power input line to receive the external power, and a secondary coil winding around the ring core and forming magnetic coupling with the primary coil to output a non-harmonic alternating current power to the power output line.

2. The plant lighting device of claim 1, wherein the ring transformer module includes a first casing and a second casing that assemble to each other to isolate the primary coil and the secondary coil.

3. The plant lighting device of claim 1, wherein the assembly seat is made of a metal material having a preferred heat dissipation coefficient.

4. The plant lighting device of claim 1, wherein the assembly seat is a rectangular tube.

5. The plant lighting device of claim 1, wherein the illumination module comprises a sealing cover for sealing the ring transformer module therein.

6. The plant lighting device of claim 1, wherein the illumination module is disposed at a lateral side of the indoor planting system where the plurality of plants are planted.

7. The plant lighting device of claim 1, wherein the illumination module is disposed above a position of the indoor planting system where the plurality of plants are planted.

* * * * *